(12) United States Patent
Shen et al.

(10) Patent No.: US 9,509,092 B2
(45) Date of Patent: Nov. 29, 2016

(54) SYSTEM AND APPARATUS FOR NETWORK DEVICE HEAT MANAGEMENT

(71) Applicant: Cisco Technology, Inc., San Jose, CA (US)

(72) Inventors: Lin Shen, Saratoga, CA (US); Stephen Ong, Fremont, CA (US); Mark Siechen, Scotts Valley, CA (US); Timothy Lee, San Mateo, CA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 206 days.

(21) Appl. No.: 14/332,297

(22) Filed: Jul. 15, 2014

(65) Prior Publication Data

US 2015/0124404 A1 May 7, 2015

Related U.S. Application Data

(60) Provisional application No. 61/900,991, filed on Nov. 6, 2013.

(51) Int. Cl.
*H01R 13/629* (2006.01)
*H05K 7/20* (2006.01)

(52) U.S. Cl.
CPC .......... *H01R 13/62994* (2013.01); *H05K 7/20* (2013.01); *H05K 7/20009* (2013.01); *H05K 7/20127* (2013.01); *H05K 7/20545* (2013.01); *H05K 7/20709* (2013.01)

(58) Field of Classification Search
CPC ............. G06F 1/16; G06F 1/20; G06F 1/206
USPC ........................ 361/715–724, 679.4, 679.45, 361/679.41–679.44, 690
See application file for complete search history.

(56) References Cited

U.S. PATENT DOCUMENTS

| | | | | |
|---|---|---|---|---|
| 5,405,267 A * | 4/1995 | Koegel | ................ | H01R 13/518 439/571 |
| 6,752,662 B2 * | 6/2004 | Okamoto | ............. | H05K 3/3405 439/541.5 |
| 6,866,544 B1 * | 3/2005 | Casey | .................. | H05K 9/0058 439/607.2 |
| 6,879,486 B1 | 4/2005 | Banton et al. | | |
| 7,665,998 B2 * | 2/2010 | Kressner | ................ | H01R 12/57 439/579 |
| 8,449,203 B2 * | 5/2013 | Downs | ................. | G02B 6/4201 361/707 |
| 8,534,930 B1 | 9/2013 | Lima | | |
| 9,099,846 B2 * | 8/2015 | McKay | .................... | H02B 1/04 |
| 9,246,280 B2 * | 1/2016 | Neer | .................... | G02B 6/4246 |
| 2005/0157987 A1 * | 7/2005 | Dodds | .................. | G02B 6/4246 385/92 |

OTHER PUBLICATIONS

International Search Report and Written Opinion for PCT/US2014/062995 mailed Feb. 13, 2015.

* cited by examiner

*Primary Examiner* — Anthony Haughton
(74) *Attorney, Agent, or Firm* — Polsinelli PC

(57) ABSTRACT

Embodiments relate generally to network system and apparatus for heat management of high volume network devices. More specifically, disclosed are system and apparatus that provide for improving heat dissipation of the network devices through improved air circulations, including a PCB with at least one slot and a connector cage mounted on the printed circuit board, the connector cage being within a certain distance from the at least one slot in the PCB.

19 Claims, 3 Drawing Sheets

SYSTEM AND APPARATUS FOR NETWORK DEVICE HEAT MANAGEMENT

RELATED APPLICATIONS

This application claims priority to U.S. provisional application 61/900,991, filed Nov. 6, 2013, and entitled "Method and apparatus for improving cooling across QSFP connector cage", the disclosure of which is hereby incorporated herein by reference in its entirety for all purposes.

FIELD OF THE TECHNOLOGY

Embodiments relate generally to network system and apparatus for heat management of high volume network devices. More specifically, disclosed are system and apparatus that provide for improving heat dissipation of network devices through improved air circulation.

BACKGROUND

Network infrastructures, including servers, switches and routers, are growing more and more important as the backbones of modern information technology systems. Particularly, with the rise of cloud computation, demands for high-energy and high-throughput network devices continue to grow.

Space constraints for high-energy and high-throughput devices result in smaller devices and greater installation density. One consequence of small, dense, and high-power devices is increased heat production and retention. Hence, heat management of these devices becomes important.

For example, various types of pluggable modules (also called "transceivers") are highly active and heat generating components in network devices. Pluggable modules connect printed circuit board (PCB), of a switch, router or similar device, to an external device (e.g. fiber optic cable). A connector cage mounting on a PCB is often used to connect a pluggable module to the PCB, both electrically and mechanically. Heat management for pluggable modules is important for the network operations because pluggable modules require a certain range of temperature to function normally. For example, when the core temperature of a pluggable module reaches a certain level, the module may lower or even lose function.

Furthermore, heat management is critical for optical pluggable modules because the laser component of the optical module requires low case temperature, e.g. under 70° C., to remain its normal functions. Examples of optical pluggable modules include QSFP, SFP+, SFF, XFP, CXP, CFP, CFP2 and CFP4, etc.

Present heat dissipation technologies have limited applications in the high-throughput network devices due to space constrain and manufacture costs. Examples of the present heat dissipation technologies include integrated or riding heat sinks, and baffles, etc.

Thus, there is a need to improve heat management of high volume network devices, particularly the pluggable modules, via a cost-effective, efficient and compact approach.

BRIEF DESCRIPTION OF THE DRAWINGS

Various embodiments or examples ("examples") of the technology are disclosed in the following detailed description and the accompanying drawings.

DETAILED DESCRIPTION

Figure 1:
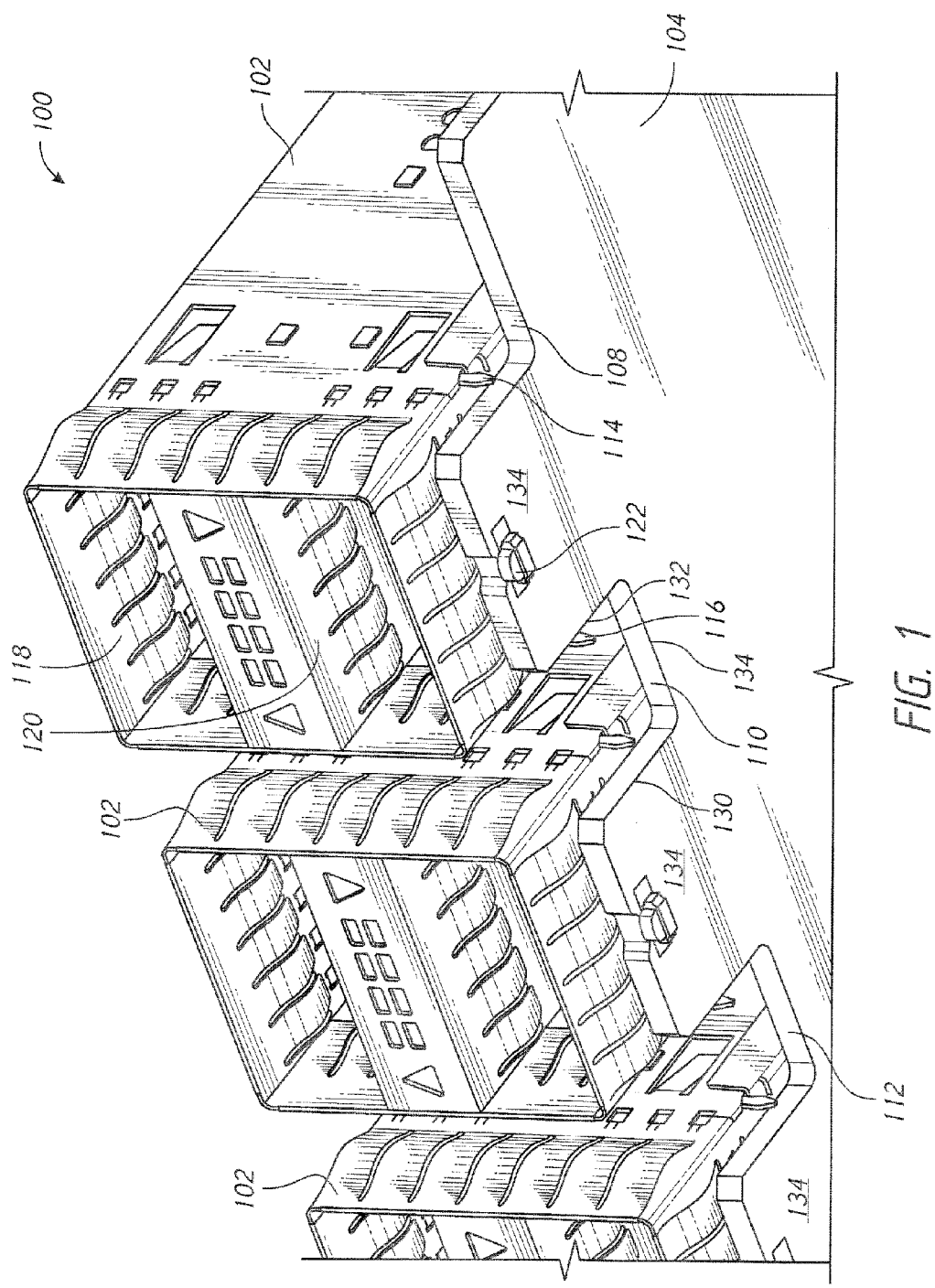
FIG. 1 is a perspective view of an example of a customized PCB-connector cage assembly, according to some embodiments.

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure.

Overview

According to some embodiments, the present technology includes a customized PCB that is deliberately slotted in one or more selected locations to promote side-to-side air flows around one or more connector cages mounted on the PCB. In some embodiments, the slots are located between the one or more connector cages. In some embodiments, the slots are located at an edge of the PCB board. In some embodiments, the slots are placed within a certain distance from the one or more connector cages to enable air flows to efficiently dissipate heat generated by the pluggable modules (in the connector cages).

In addition, the functions of the PCB remain intact as the slots can be predetermined during the PCB design, or the slots can be placed within an area that does not interfere with the circuits embedded in the PCB, e.g. the slots are within the circuit-free edge of the PCB.

According to some embodiments, the present technology can enable a partial overhang sides of the connector cages mounted on the PCB. In some embodiments, at least one of the pins associated with the connector cage is not pressed into the PCB through press fit mates. The remaining pressed-in pins can provide sufficient force to couple the connector cage to the PCB.

According to some embodiments, the present technology can provide an efficient and cost-effective heat dissipation design for various types of pluggable modules, including various optical pluggable modules such as QSFP, SFP+, SFF, XFP, CXP, CFP, CFP2 and CFP4, etc. In addition, the pluggable module can be at least one of a fiber optic based module or a copper based module.

In addition, even though the present discussion uses QSFP as an example of the applicable pluggable modules, the present technology is conceptually applicable to any heat-generating components mounting on a substrate plate within a network device.

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

In a PCB-connector cage assembly, the compact arrangement of these highly active pluggable modules can cause heat dissipation issues in the network device. Particularly, the PCB often has a wall-to-wall design that blocks convective air circulation and limits heat dissipation of the pluggable modules. In addition, heat loss through the sides of connector cages is minimal due to parallel connector cages in close proximity. Furthermore, natural convection cooling on the outer portion of the pluggable module is also relatively small due to the low air speed and little volume of air movement.

The present technology discloses a customized PCB-connector cage assembly that promotes convective air cooling through one or more slots in the PCB, thus improves the thermal margin in the network device.

FIG. 1 is a perspective view of an example of a customized PCB-connector cage assembly, according to some embodiments. As shown in FIG. 1, a customized PCB-connector cage assembly 100 includes one or more connector cages (e.g. 102), and a PCB 104. PCB 104 includes one or more slots (e.g. 108, 110 and 112) located at the circuit-free edge. The one or more slots can permit side-to-side air flows for convective air circulation around each of the connector cages as well as the pluggable modules (not shown).

As illustrated in FIG. 1 the slots are recesses formed in the printed circuit board that are defined by edges of the circuit board. Specifically, the recess is formed on two sides by edges 130 and 132 of the circuit board. These edges are formed on either side of projections 134 in the printed circuit board that support the connector cages 102. As illustrated in FIG. 1, projections 134 can be narrower that the connector cages 102 such that the connector cages 102 overhang the projections. The depth of the slot is bounded by rear edge 134 of the circuit board.

According to some embodiments, the slots 108, 110 and 112 can be of any shape, including squares, ovals, circles, or polygons as long as they can create effective air ways in the network device. In some embodiments, slots 108, 110 and 112 can be U-shaped.

Locations and sizes of the slots can be decided on multiple factors including the proximity to the heat generating components, the circuit-free space available on the PCB, etc, via thermal calculations and/or experiments. For example, the slots can be located in an interior area of PCB 104 as long as they can provide effective air ways and do not interfere with the PCB functions. In some embodiments, locations and sizes of the slots can be decided during a PCB design. In some embodiments, the slots can be placed within a circuit-free edge area of the PCB, as shown in FIG. 1.

According to some embodiments, instead of being pressed into PCB 104, pins 114 and 116 that are located at the bottom of connector cage 102 can overhang PCB 104. The remaining pressed-in pins can provide sufficient force to attach connector cage 102 to PCB 104 through press fit mates. In some embodiments, overhang pins 114 and 116 can limit the horizontal movement of PCB 104 through fixing a protruding portion of PCB 104, as shown in FIG. 1. In addition, various types of attachment mechanisms (e.g. hooks, anchors, guiding rails) can be utilized to mount connector cages to PCB 104.

In addition, LED indicator 122 can be located below connector cage 102. LED indicator 122 can indicate the working status of the corresponding pluggable module, e.g. green or red.

Still referring to FIG. 1, pluggable modules (not shown) can be individually plugged into module ports 118 and 120 and connect with PCB 104 through interface connectors (not shown) of connector cage 102. One example of the pluggable module is QSFP (Quad Small Form-factor Pluggable, also QSFP+). QSFP is a compact, hot-pluggable transceiver used for data communications applications. QSFP can allow data rates from 4×10 Gbit/s or even higher. As shown in FIG. 1, a plurality of QSFPs, for example, 8, 16, 32 or 44, can be placed on PCB 104 through multiple connector cages to generate the Terabit throughput, which also produce a substantial amount of heat in the network device.

Furthermore, connector cage 102 can include one or more interface connectors (not shown) that are mechanically and electrically connected to PCB 104. Thus, when pluggable modules are plugged into connector cage (e.g. 102), pluggable modules can mate with the interface connectors and thus electrically connect to PCB 104.

Figure 2:
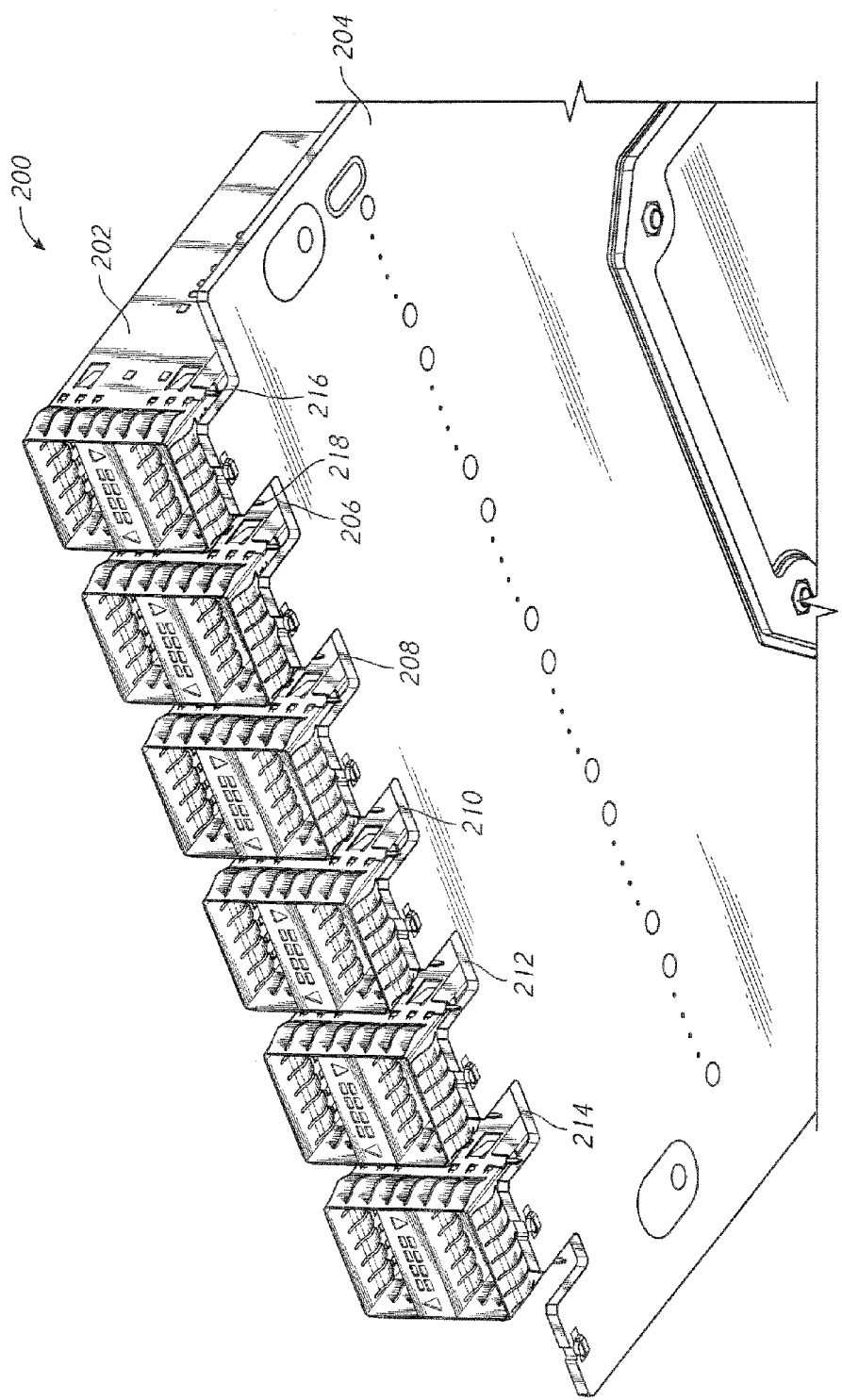
FIG. 2 is a perspective view of an example of a bottom customized PCB-connector cage assembly as shown in FIG. 1, according to some embodiments.

FIG. 2 is a three-plane perspective view of an example of the customized PCB-connector cage assembly as shown in FIG. 1, according to some embodiments. In the customized PCB-connector cage assembly 200, a plurality of cage connectors (e.g. 202) are placed on PCB 204 through press in mates (not shown). For example, in FIG. 2, there are six parallel connector cages on PCB board 204, each of them can host two pluggable modules. As shown in FIG. 2, edged slots 206, 208, 210, 212 and 214 on PCB board can create convective air circulation to promote side-to-side air flows around the one or more connector cages as well as their corresponding pluggable modules. Furthermore, pins 216 and 218 can be exposed in the said edged slots and can overhang PCB 204, as described herein.

Figure 3:
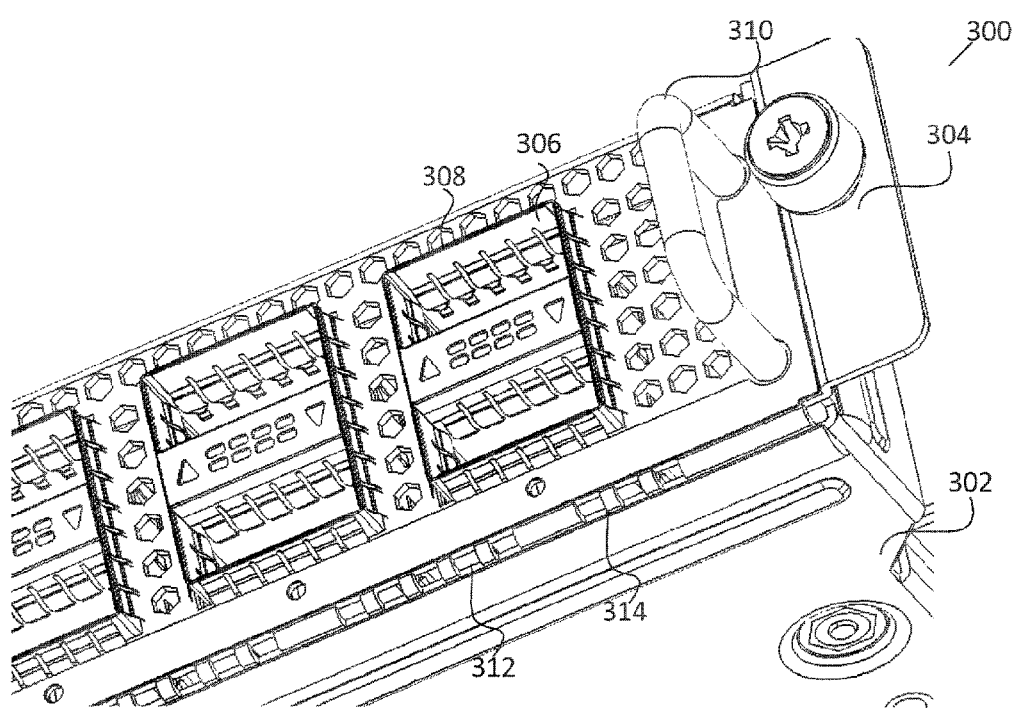
FIG. 3 is a close up perspective view of an example of a network device incorporating a customized PCB-connector cage assembly, according to some embodiments.

FIG. 3 is a perspective view of an example of a network device incorporating a customized PCB-connector cage assembly, according to some embodiments. In some embodiments, network device 300 (e.g. a switch blade) includes a plurality of connector cages (e.g. 308) that can be used to receive multiple pluggable modules (not shown) through module ports (e.g. 306). The connector cages are attached to a customized PCB (not shown) through an attachment mechanism (e.g. press fit mates). The plurality of connector cages and the customized PCB can be fit into a device housing including bottom plate 302 and faceplate 304. A PCB can reach the back sheet of faceplate 304 ('wall-to-wall" design) and form a closed space for any components mounting on the PCB, including the pluggable modules and the connector cages, thus blocking air circulation around these components.

As depicted in FIG. 3, the two perpendicular sides of the network device, bottom plate 302 and face plate 304, can leave an air gap at their conjunction that can enable air to enter the device housing. Furthermore, multiple slots (e.g. 312, 314) in a customized PCB can provide venting holes for air to further enter the conventionally closed space (now is a relative open space due to the slots) through bottom plate 302. Thus, these slots can promote increased convective air circulation within the network housing and reduce the internal temperature of network device 304.

In addition, network device 300 can include a handle 310 on faceplate 304 to facilitate easy installation and maintenance in a stacked network system.

Although the foregoing examples have been described in some detail for purposes of clarity of understanding, the above-described inventive techniques are not limited to the details provided. There are many alternative ways of implementing the above-described techniques. The disclosed examples are illustrative and not restrictive.

What is claimed is:

1. A system for improving heat dissipation in a network device, comprising:

a printed circuit board including a plurality of projections formed along at least one edge, the projections positioned along the at least one edge to define at least one slot between at least two or more of the plurality of projections, the at least one slot configured to improve heat dissipation in the network device by permitting air circulation thereabout; and a connector cage having one or more pins positioned about the connector cage for securing the connector cage on a top surface of at least one of the plurality of projections of the printed circuit board.

2. The system of claim 1, further comprising:

a pluggable module coupled to the connector cage through a port associated with the connector cage.

3. The system of claim 2, wherein the pluggable module is one of a QSFP, SFP+, SFF, XFP, CXP, CFP, CFP2 or CFP4.

4. The system of claim 1, wherein at least one of the plurality of pins overhangs the at least one of the plurality of projections of the printed circuit board.

5. A system for improving heat dissipation in a network device, comprising:

a substrate plate including a plurality of projections formed along at least one edge, the projections positioned along the at least one edge to define one or more slots, the one or more slots configured to improve heat dissipation in the network device by enabling air circulation thereabout; and a plurality of connector cages, each connector cage having one or more pins positioned about its exterior for coupling said each connector cage on a top surface of a respective projection of the plurality of projections.

6. The system of claim 5, wherein the substrate plate is a printed circuit.

7. The system of claim 5, wherein the one or more slots do not interfere with functions of the printed circuit.

8. The system of claim 5, wherein at least one of the one or more slots is formed in a middle of the substrate plate.

9. The system of claim 5, wherein the one or more pins form a press fit mating structure.

10. The system of claim 9, wherein at least one of the one or more pins overhangs one or more projections formed along the edge of the substrate plate.

11. The system of claim 5, further comprising:

one or more pluggable modules coupled to the plurality of connector cages through one or more ports associated with the plurality of connector cages.

12. The system of claim 11, wherein the one or more pluggable modules includes at least one of a QSFP, SFP+, SFF, XFP, CXP, CFP, CFP2 or CFP4.

13. The system of claim 5, further comprising:

a housing configured to contain the substrate plate and the plurality of connector cages, the housing having an air gap in a bottom plate of the housing.

14. An apparatus for improving heat dissipation in a network device, comprising:

a printed circuit board including a plurality of opening, each opening defines a respective air gap for improved air circulation thereabout a connector cage including at least one press fit mate attachment mechanism, the at least one press fit mate attachment mechanism configured to secure the connector cage on a top surface of the printed circuit board proximate one or more of the plurality of openings of the printed circuit board; and a pluggable module configured to couple to the connector cage.

15. The apparatus of claim 14, wherein the at least one press fit mate attachment mechanism includes a plurality of pins configured to mate with the printed circuit board.

16. The apparatus of claim 14, wherein the pluggable module comprises at least one of a fiber optic based module or a copper based module.

17. The apparatus of claim 14, wherein the plurality of opening are located at an edge of the printed circuit board.

18. The apparatus of claim 14, wherein the plurality of opening are located in a middle of the printed circuit board.

19. The apparatus of claim 14, wherein the plurality of opening enable side-to-side air flows around the connector cage.

* * * * *